United States Patent [19]
Ruthner

[11] 4,255,897
[45] Mar. 17, 1981

[54] METHOD AND APPARATUS FOR THE IMPROVEMENT OF STORAGE OF BIOCHEMICAL ENERGY IN PLANTS

[76] Inventor: Othmar Ruthner, 150, Sieveringerstrasse, A1190 Vienna, Austria

[21] Appl. No.: 89,085

[22] Filed: Oct. 29, 1979

Related U.S. Application Data

[63] Continuation-in-part of Ser. No. 902,858, May 4, 1978, abandoned.

[30] Foreign Application Priority Data

May 12, 1977 [AT] Austria ............................ 3405/77

[51] Int. Cl.³ ............................................ A01G 31/02
[52] U.S. Cl. ............................................ 47/65; 47/17; 47/82; 47/DIG. 6
[58] Field of Search ............................ 47/59–65, 47/17, 58, DIG. 6, 82–83

[56] References Cited

U.S. PATENT DOCUMENTS

| | | | |
|---|---|---|---|
| 2,244,677 | 6/1941 | Cornell | 47/65 X |
| 3,254,447 | 6/1966 | Ruthner | 47/65 |
| 3,254,448 | 6/1966 | Ruthner | 47/65 |
| 3,343,300 | 9/1967 | Englert | 47/17 |
| 3,529,379 | 9/1970 | Ware | 47/17 |
| 3,807,088 | 4/1974 | Jones | 47/17 X |
| 3,905,153 | 9/1975 | Enter | 47/17 X |
| 4,003,160 | 1/1977 | Muller | 47/17 X |
| 4,028,847 | 6/1977 | Davis et al. | 47/65 |
| 4,068,405 | 1/1978 | Campbell et al. | 47/65 |

FOREIGN PATENT DOCUMENTS

250728 3/1966 Austria .................................. 47/65
84769 9/1971 German Democratic Rep. .

Primary Examiner—Robert E. Bagwill
Attorney, Agent, or Firm—Fleit & Jacobson

[57] ABSTRACT

A plurality of space lattices arranged within an enclosed cultivation space, wherein one space lattice consists of plants which are arranged to move in a continuous vertical serpentine path within the space lattice. A space lattice formed of illumination means is arranged in an interstitial manner relative to the circulating plant lattice and serves to artifically illuminate the plants while they are circulating. A measurement space lattice is arranged coextensive with the illumination space lattice and serves to make measurements of selected parameters of environmental parameters within the cultivation space. An environmental factor space lattice is also arranged coextensive with the illumination space lattice and is connected to suitable sources so that moisture, nutrients and selected gases may be supplied to the plants as they circulate through the cultivation space.

16 Claims, 9 Drawing Figures

METHOD AND APPARATUS FOR THE IMPROVEMENT OF STORAGE OF BIOCHEMICAL ENERGY IN PLANTS

BACKGROUND OF THE INVENTION

The present application is a continuation in part of my copending application, Ser. No. 902,858, filed May 4, 1978 (now abandoned).

The present invention relates to a method and apparatus for improving the storage of biochemical energy in plants by using an accurately controlled environment including solar energy or other electromagnetic radiation, whereby photosynthesis occurs as a result of sunlight, artifical light, or a combination thereof.

Plants growing in a wild environment exhibit an extremely economic life system, and such plants are typically in an economical equilibrium with their environment. For thousands of years, by propagating and cultivating techniques, man has changed the generic information of a plant to favor his livelihood to such an extent that the cultivated plant thus created supplies man with a much greater degree of biochemical energy, in the form of foodstuffs or nutrients, than the plant did in its original wild state. Nevertheless, with progressively increasing populations, traditional agriculture methods no longer suffice to provide the necessary quantities of foodstuffs. Additionally, the changing of the infrastructure by eutrophy, environmental contamination, storage problems, transportion, packing, and preserving increases the costs and lowers the production of the necessary foodstuffs.

The cultivation of plants has been carried out for many years under the protection commonly called a greenhouse. These cultivation methods typically take place on a horizontal plane and the operation is carried out principally with soil substratums. It has now become possible by means of phytotechnological methods, independently of the situs or the season, to produce any quantity of biochemical energy in substance form with the aid of primary and secondary plant products. The generic information of the plant is thereby ecologically manipulated by man to obtain a certain production objective during the course of growth within the generic scatter width. Recently, hydroponic culture methods have been proposed and used, whereby only a few environmental factors are controlled, and these are essentially restricted to water, nutrients, heat, and ventilation. Additionally, using artifical lighting permits a photoperiodic control of the growth of the plants so that decorative plants may be caused to bloom at certain times (chrysanthemum cultivation), while the photosynthesis reaction is controlled only to a moderate extent. The results obtained in these situations depend upon the limits placed on the illumination capabilities, such as the spacing between the lamps, the power and location of the lamps, etc.

SUMMARY OF THE INVENTION

The present invention provides a method and apparatus for improving the storage of biochemical energy in plants by utilizing externally supplied energy, whereby the photosynthesis occurs by the light energy applied to the plants by means of light grids which are arranged in a three-dimensional matrix or space lattice in an interstitial manner relative to the plants. The plants are also arranged in a three-dimensional matrix, with the plants being movable within this matrix in relation to the light grid. The present invention further includes at least one measuring grid, which is another three-dimensional space lattice of measuring elements and an environmental factor grid, which is also a three-dimensional matrix. The present invention is described as a three-dimensional matrix in the interest of clarity. It could also be called a solid lattice, or a gridwork solid, a spatial array or any number of other terms common to physics, chemistry or solid geometry. The measuring grid is provided with measuring devices for determining the various parameters inside the apparatus. The environmental factor grid includes devices to affect directly the environmental factors in the region of the plant, i.e., moisture, air circulation, gas environment, and fertilization. By suitable control techniques the formation of photosynthesis products for plant energy storage has a maximum value, while the energy reducing respiration processes of the plant are reduced to a minimum. The three space lattices which are not movable are substantially coextensive.

The present invention provides a plant growing installation in which the factors affecting the growth of the plant are so controlled or modified that the photosynthesis process occurs at the optimum level. This is achieved in accordance with the present invention by providing a movable plant grid or lattice which is movable relative to a light grid, a measuring grid, and an environmental grid. These elements form a multi-grid system, whereby the measuring grid is provided with devices for affecting the environmental factors in the region of the plant, so that the formation of photosynthesis products is maximized for energy storage and the energy reducing respiration processes are minimized.

According to another feature of the present invention, the plant preferably operates on photosynthesis, whereby in the propogation space, the carbonic acid content is increased and the oxygen content reduced and, if necessary, the oxygen content in the sprouting space is increased during darkness hours, while simultaneously reducing the temperature.

In accordance with the present invention the breathing processes of the plants should occur only to the extent required by the plant for maintaining its life system; in no event, however, reducing the production output of the formation of primary products, e.g., hydrocarbons, polysaccarides, or secondary products, e.g., vitamins, alkaloids, steroids. Also, in accordance with the present invention, the actual life system of the plant is supplied with so much energy that it enables it to yield its optimum production output, due to this extra energy and added nutrient supply. The thermal energy released by the light irradiation, in accordance with the present invention, is used to raise the temperature only insofar as it corresponds to the optimal photosynthesis temperature. In the event of passing into an additional temperature range, the heat is discharged by means of the air conditioning system, which cools the inventive installation. If in hot climates, the cooling device is required for the cultivating chamber, then this will result in higher costs than those involved in providing artificial grid lighting. In which case, the plant grid, in accordance with the invention, is wholly or partly screened relative to the light irradiation, the light irradiation is entirely switched off, or the system is insulated and made heat sealed to prevent the environmental temperatures from affecting optimum photosynthesis.

In another embodiment of the inventive three-dimensional multi-grid plant production system, the invention may be carried out underground, whereby the sunlight is supplied to the cultivating space by means of either light conductor systems, via incorporated light permeable apertures, or by adjustable window strips, which permit sunlight to enter into the cultivating space.

According to a further feature of the present invention, the oxygen content of the cultivating space or chamber is maintained as low as possible during the photosynthesis operation, wherein the oxygen-enriched air of the cultivating chamber is utilized to produce carbonic acid by combustion of fuels, such as vegetable remains or waste materials and/or preferably hydrocarbons such as methane, propane, butane, etc., whereby the mixture of carbonic acid and steam created thereby is returned to the cultivating chamber in order to increase the photosynthesis output.

Additionally, in accordance with the present invention, the cultivating space is provided during the period of darkness with normal external air, preferably in a somewhat cooled state. The atmosphere of the cultivating space is preferably cooled by a cooling plant, whereby the biochemical reaction speed substantially reduces the breathing of the plant.

Accordingly, it is an object of the present invention to provide a plant grid which is movable in relation to a fixed light grid, measuring grid, and environmental factor grid, such that the photosynthesis of the plant is optimized.

It is another object of the present invention to provide a system for optimizing the photosynthesis of plants, wherein a three-dimensional matrix pipe system is employed to deliver water, food and gases to the plant growing installation.

It is also an object of the present invention to provide a system for optimizing the photosynthesis of plants, wherein the plants are arranged on a movable three-dimensional lattice or matrix, wherein the speed of the movable lattice is controllable, and wherein the vertical surfaces of the plants are irradiated by a three-dimensional matrix of light sources.

DETAILED DESCRIPTION OF THE INVENTION

Figure 1:
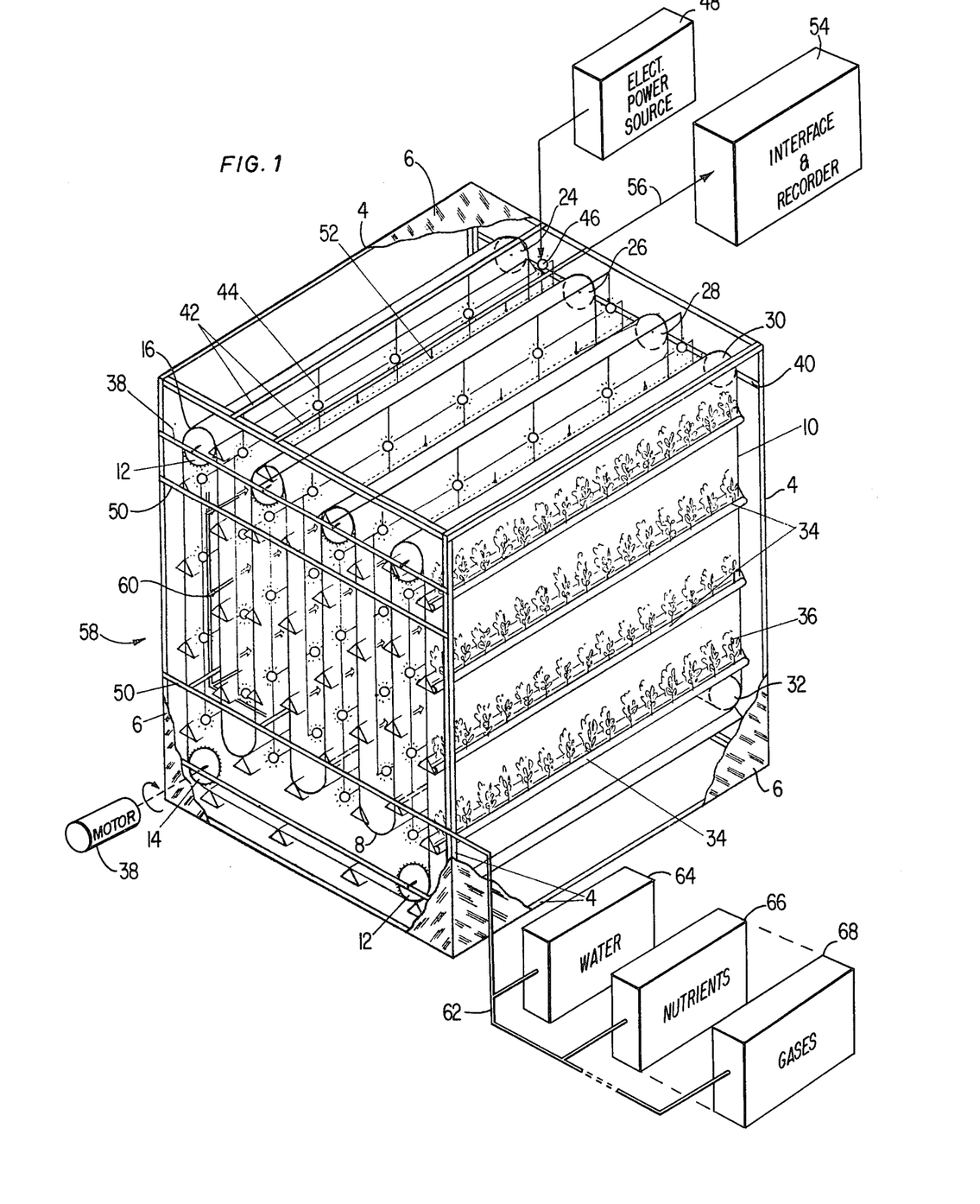
FIG. 1 is a perspective of a multi-grid system with certain identical elements not shown for simplicity and certain elements shown symbolically for clarity.

In FIG. 1, a typical plant growing installation according to the present invention is shown in perspective. The installation in this embodiment is formed of a grid structure 4 which may be constructed of suitable metal beams or channels, and the framework 4 is covered with a transparent covering material 6. The transparent material has been broken away in this figure in order to show the interior of the installation. The frame members 4 must form a rigid and stable metal construction, and the metal vertical and horizontal sections can be welded together, riveted, or bolted following conventional construction techniques. Inside the installation, two endless chains, 8 and 10, are arranged over rotatably mounted sprockets. In the case of endless belt 8, it is arranged over sprockets 12, 14, 16, 18, 20, and 22, whereas endless chain 10 is arranged over sprockets 24, 26, 28, 30, and 32, with sprocket 33 corresponding to sprocket 14 being hidden in this view. Each chain follows a vertical continuous serpentine path. It should be noted that the chains 8 and 10 are principally suspended from the top, with only two reversing sprockets 12, 14, 32, and 33, being located at the bottom corners of each of the chain assemblies. The two chains, 8 and 10, are interconnected by a number of plant containers, shown typically at 34, which are pivotally affixed at their respective ends to corresponding points on the chains. Plants, shown typically at 36, are inserted into the containers 34 at regularly spaced intervals. The plant trays 34 are pivotally attached to the chains, 8 and 10, such that the trays act as pendulums, and the weight thereof keeps the trays at all times in the proper orientation, regardless of the instantaneous position of the chains. This keeps the plants 36 in a constant vertical orientation.

The entire plant tray conveyor system is driven by means of a motor 38, which drives one of the reversing sprockets, for example, sprocket 14. The motor 38 may be located inside the installation or may be located outside the installation, with the drive shaft of the motor penetrating the covering 6. The chains, 8 and 10, are supported only by the upper sprockets, 16 through 22 and 24 through 30, and these sprockets are rotatably mounted respectively on side rails or channels, 38 and 40. The sprockets are mounted on these side rails, 38 and 40, in such a manner that their location may be adjusted, thereby varying the spacing between the successive upper sprockets and thus the spacing between the members of the suspended plant grid. As may be seen from FIG. 1, by means of the plant trays 34 and the sprocket and chain arrangements, a three-dimensional matrix of plants is provided. The coils or loops of the chains, having the plant trays affixed thereto, are freely suspended downwards from the upper sprockets, and the length of the downward suspended loops may be selected based upon the height of the cultivation space available. Thus, the inventive apparatus is adaptive to the building or locale available for the installation. The plants 36 are circulated through the cultivation space to form the movable plant grid, the grid constant of which is variable due to the growth of the plants.

Upper structural elements 42 are arranged substantially parallel to the plant trays 34 at the top of the frame-work 4 and serve to suspend the inventive light grid structure. The light grid structure comprises cables or rods 44 which suspend, at regular intervals, lighting bodies or illumination means 46. The lighting bodies 46 are arranged on the cables or rods 44 to form a three-dimensional matrix of light producing bodies in the cultivation space. The light bodies of this illumination space lattice are arranged in the interstices of the continuous serpentine path followed by the plants. The lighting means are powered by a suitable electrical power source 48, which is controllable to vary the light output of the light sources 46. The three-dimensional lighting matrix is supported at its outer ends by side rails 50, which are integral structural parts of the framework 4. The horizontal and vertical spacings of the lighting sources 46 are preselected to provide a constant and stable light output available to the circulating network of plants. The individual light sources are preferably mounted in the light grid so that they are easily changeable or replaceable, whereby the specific bandwidth of radiation produced by the light sources can be selected for optimum photosynthesis. Alternately, provision may be made for installing optical filters over the light sources to select the desired wavelengths of the light output. As indicated, the electrical power source may be one which is regulatable such that the level of illumination in the cultivating space may be made brighter or dimmer as required. The regulation of the light output is particularly necessary when aspiration of the primary or secondary products of the plants is to be prevented. As will be explained below, the brightness of light may be adapted extensively to the compensation point.

An additional grid or three-dimensional matrix or lattice arrangement is arranged within interstices of the three-dimensional matrix of the plants and substantially coextensive with the lighting matrix. This additional grid comprises measuring devices, shown typically at 52. These measuring devices 52 are suspended from the upper structural crossbars 42 of the framework 4 and are located in the installation chamber by the side supports 50. The three-dimensional matrix of the measuring grid is a stable arrangement having spacings at constant intervals between the individual measuring devices 52. The devices are arranged in perpendicular and horizonal rows and are so spaced that they may monitor or check the entire cultivating space. The measuring devices 52 are not intended to be identical devices, rather, they comprise different types of measuring instruments for measuring or detecting brightness, carbon dioxide, water content, and other environmental parameters, whereby the gas reactions and the photosynthesis or the respiration processes of the plants are controlled. Each of the measuring elements 52 is connected to an interface and recorder unit 54, by means of a multiline cable 56. The measuring elements 52 are not all the same type of elements and comprise means for measuring various parameters. Measuring element 52 might comprise a light measuring unit, which measures the light on one plane and produces an output indicating the light intensity, in candle power, on a plane surface. This measurement is important for the determination of photoperiod duration and for the monitoring of photosynthesis, as well as of the dark period at one point in space. Another type of light measuring unit may be a spherical light measuring unit, which detects the light intensity, in candle power, on a spherical surface upon which the light impinges from all directions. This measurement is important for the determination of the duration of the photoperiod of photosynthesis, as well as of the dark period at one point in space. Another sensor might comprise an air humidity measuring unit, which measures the relative air humidity or the humidity of other non-aggressive gases in the cultivating installation. Another parameter which is of interest is the air temperature, and a suitable sensor is provided to measure the temperature of the environmental air, or of the non-aggressive gases in the cultivation installation. These units would be located at strategic preselected points in the measurement network and the outputs therefrom fed to the recorder unit 54. Another example of a parameter inside the cultivation space which would be desirable to monitor or measure is the extent of the wind, the measurement device would comprise an anemometer unit to measure the flow velocity of air or other non-aggressive gases in the cultivation space. Additionally employed might be a wind direction indicator, a thermal radiation detector, to measure the short-wave component of radiation turnover, such as radiation of the sun, sky radiation, and reflex radiation on plane surfaces, and a radiation balance sensor for direct measurement of radiation caused heat turnover. This unit would measure the difference between the impinging radiation (direct and reflective) and the reflected radiation on a surface to be measured. In addition to the sensors which are positioned in the measurement grid, other sensors might be provided and connected to the recorder 54. Such sensors would be used manually and would not be arranged in the grid. For example, a sensor could be inserted into the soil to detect the soil humidity of the fillings in the plant trays 34. Such fillings might comprise sand, peat moss, pearlite, Vermiculite, or any other type of organic or synthetic filler mixture. Additionally, a probe which would provide a measurement of the soil temperature might be employed and connected to the recorder 54. Such temperature probe would measure the temperature of the filling in the plant trays 34.

All of these measuring elements, whether or not they are a part of the measurement grid, are connected to a six-color chopper bar recorder 54 for analog indication and registration of the parameters being measured. The recorder 54 produces a chart, which represents environmental progress versus time by a series of curves drawn on the chart. It is understood, of course, that each of the sensors in the grid is connected via multiline cable 56 to the recorder 54, and each connection is made through a suitable interface module, which adjusts the level of the analog signal being produced so that the recorder can produce a meaningful diagram. Alternatively, the recorder could be replaced or supplemented by means of an analog-to-digital converter and rather than producing an analog strip chart, digital signals representing the measured parameters might be produced, a paper tape could be punched, or some other type of digital display provided. Typical of the chart recorder, measurement devices, and interface units is the UNIRUT-8 system, which is an eco-physiological measuring installation for environmental and bio-technology and which is commercially available.

A further grid is provided located within the three-dimensional plant lattice, in the form of an environmental factor grid 58, and this grid comprises a lattice of pipes 60, which are secured to the side elements 50 of the framework 4. This space lattice is also arranged in the interstices of the movable plant space lattice and is arranged substantially coextensive with the illumination space lattice and the measurement space lattice. The pipes forming this environmental factor grid have outlets or openings for the discharge of water, nutrient solutions, hydrosols, aerosols, oxygen, carboxylic acid, etc., whereby the atmospheric nature of the interior of the cultivating space, and in particular the region of the plants 36, is influenced with regard to temperature, moisture, etc. The pipes 60 are connected through a manifold piping arrangement 62 to sources for the water, nutrients, and gases; the sources are shown respectively at 64, 66, and 68. It is appreciated that the activation of these various sources for water, nutrients, and gases may be accomplished manually by the operator of the installation, or the sources could be automatically activated by means of a controller, which would periodically turn on the appropriate elements. Additionally, the present invention envisions using the information and data which is available from the measurement grid, in conjunction with a programmed microprocessor, to provide control signals for activation of the sources of the environmental grid. The measurement grid signals could be obtained directly from the measuring device, or could be obtained from the interface units.

The present invention provides a plurality of grid networks, as described above, which are fixed in the cultivation space and provide a circulating matrix of plants, which is movable within the cultivation space and movable in relation to the other fixed grids or lattices described above. The combination of the frame structure 4, the plant grid system 34, the light grid 44, the measuring grid 52, and the environmental factor grid 60 form a synergystic multi-grid system wherein each of the matrices forming the system cooperates and interacts with the other to provide a number of advantages which will be pointed out hereinbelow.

Figure 2:
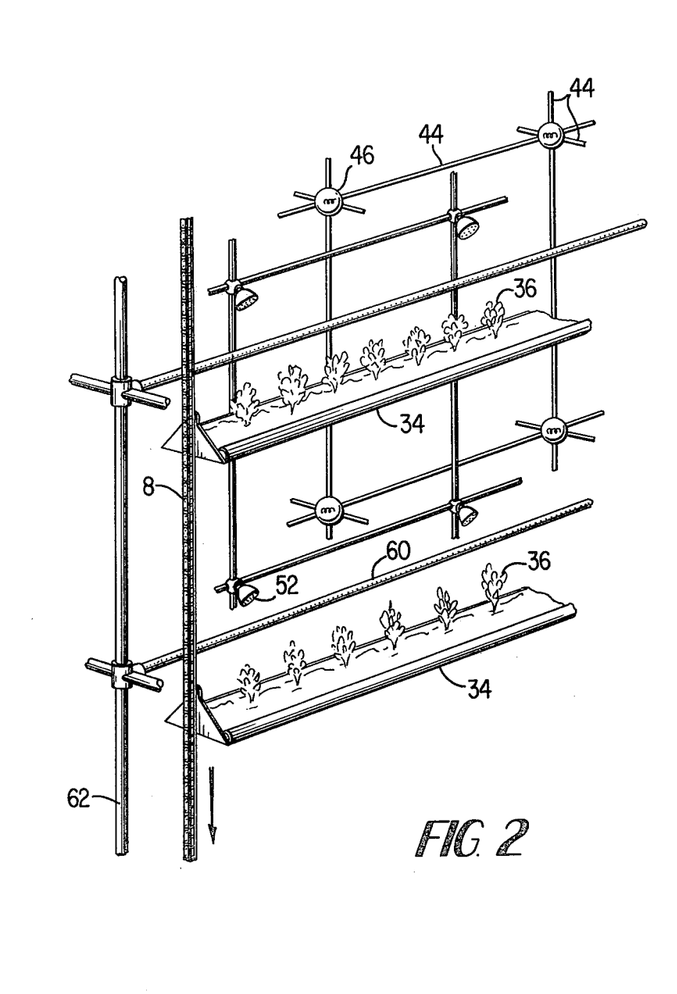
FIG. 2 is a detailed showing of a portion of FIG. 1.

FIG. 2 is an enlarged perspective of a portion of the inventive insulation of FIG. 1 showing the light sources 46 arranged in a three-dimensional matrix, although it should be understood that the matrix of FIG. 2 is only two-dimensional, the other elements being into and out of the plane of the paper of FIG. 2. Additionally, the measuring grid with measurement elements 52 is shown, as is the environmental factor grid 58 having the pipe arrangement 60. As may be seen, the plant trays 34 are connected to the driven chain 8, such that as the chain circulates through the installation, the plant trays 34 containing the individual plants 36 are driven past the various fixed three-dimensional grids.

Figure 3:
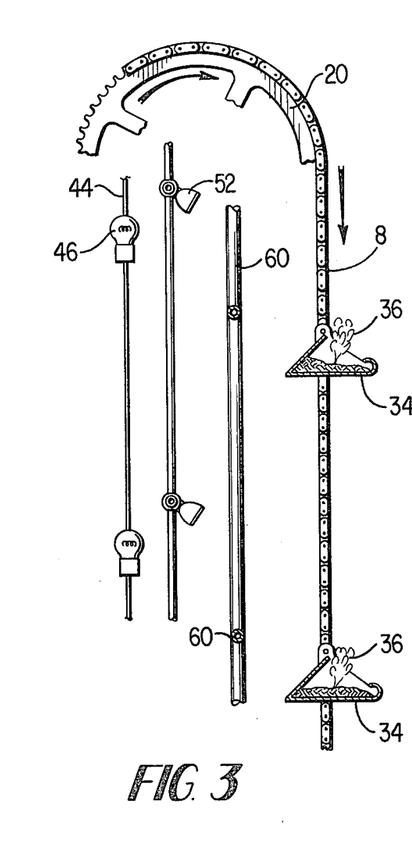
FIG. 3 is a schematic view of the detail of FIG. 2 viewed from the end.

FIG. 3 is a side elevation looking into the end of the inventive installation of FIG. 1. In FIG. 3, the light grid 46, the sensing grid 52, and the environmental factor grid 60, are arranged to cooperate with the moving plant grid, comprised of the chain 8, the plant holders 34 and the plants 36. As seen in FIG. 3, the plant grid moves in a downward manner, with chain 8 riding over the top of upper idler sprocket 20. In FIGS. 2 and 3 it may be seen that a variable, circulating three-dimensional plant matrix is caused to travel past a fixed light matrix, a fixed measurement matrix and a fixed environmental factor matrix, all located within a single framework 4. The elements of these matrices cooperate in such a manner that the course of growth of the plants in the cultivation space may be regulated by the environment factors of light, heat, carbonic acid, oxygen, and steam content.

The combination of the moving or circulating plant matrix with the light matrix and the other three-dimensional matrices yields a number of advantages. For example; (1) by the extensive use of the laws of spacing (e.g., quantitative light utilization or spatial addition of the brightness), the light grid and elements 46, within the scope of the law of spacing, permits the brightness to be considerably increased, while the number of lamps may be greatly reduced by following the inventive teachings herein. Accordingly, it is possible to irradiate vertical cultivating surfaces up to 8 m² per lamp (400 watts) when installed in the lattice fashion taught herein with 20,000–30,000 Lux, which is equivalent to a great savings in energy consumption and equipment costs. The plant lattice spacings may be accurately calculated at any brightness and are subject to eco-physiological laws. (2) The timed light control is constantly produced for the photoperiodic lighting effects. (3) The light quality may be varied by the use of lamps of different wave lengths, so that special photo effects may be obtained (e.g., the phytochrome 730 effect). As indicated above, the lamps may either be replaced with other lamps producing the desired radiation spectrum, or optical filters may be placed over the lamps to obtain the desired wavelength of radiation. (4) The plant is illuminated and irradiated from all sides, since the light sources are located in a three-dimensional lattice relative to the circulating plant lattice, such that a saturation with light is quickly obtained, and shading by leaves, etc., is substantially prevented or at least minimized. (5) The illumination time is dependent upon the season and, by means of the light lattice, may be extended to total 24-hour daily illumination. (6) The brightness or light strength is retained above the compensation point of the photosynthesis and the respiration process, so as to substantially reduce unwanted plant respiration, whereby an automatic control of the carbonic acid and oxygen content of the cultivating atmosphere is attained. (7) Prevention of light respiration with excessive light radiation through $CO_2$ or oxygen control by means of measurements taken by the measurement grid. (8) The movement of the plant lattice in relation to the light matrix, provides a constant fluctuation of the light strength on the plant and, as such, is tantamount to a sprinkling with light, which is of importance for the conveying of assimilates, e.g., in the chloroplasts. (9) The light grid or matrix produces a relatively even irradiation of the plant, and, hence, a uniform morphological shape or structure of the mature plant. (10) The circulating plant grid produces mutual shading, such that heat and light accumulations in the cultivating space are prevented or at least substantially minimized. (11) The plant grid produces a cooling effect by transpirations or water evaporation in the cultivating space, which corresponds to a forest culture and lowers the cooling costs of the cultivating installation in hot and arid regions. (12) The light grid permits the optional formation of light density, light distribution, and provision of definite lighting mean values and light effects, which influence the substance conveyance in the plants. (13) The plant lattice drive may be regulated to achieve speed ranges anywhere from 0 to 5 meters per minute, or higher if desired. This ability to achieve this variation in speed is necessary in order to work the soil, to harvest the crops, to perform various soil measurements, or to perform various other chores in the installation. (14) The plant grid enables harvesting to be carried out at any desired period of the day. This is an important feature because it is well known that the contents of primary and secondary products of plants differ at certain periods of the day. (15) By means of the environmental factor grid 58, all other environmental values complimentarily affecting the growth of the plants in the region of the plants are favorably influenced. For example, moisture is controlled by outlet openings in the environmental factor grid for water which may be sprayed when excessive heat developes. The gas consumption of the air, $CO_2$—, $O_2$—, aerosol content, etc., may also be controlled. Similarly, the chemical nature of the substances in the root space, the substrate, the nutrient solution, fertilization, etc., may also be optimally controlled.

The multiple lattice system according to FIGS. 1 to 3 allows for solar irradiation into the cultivating spaces to be compensated for in such manner that it may optionally influence the photosynthesis. Within the broad scope of regulation which may occur, the light grid may be either completely cut out, with the photosynthesis being exclusively produced by the sun, or by way of connecting and switching variations, the radiation of the sun can be combined with the light grid to improve the photosynthesis effect, or the irradiation of the sun can be completely eliminated. Decisive for the selection of the particular light mixture is the type of plant under cultivation, i.e., either sun or shade plants, the position of the compensation point and, last but not least, the costs. Only too often in such cases, it has to be considered that cooling costs in hot regions can exceed by far the lighting costs. In other words, it may be more economical to use an opaque, fully insulated building and provide all illumination artifically than to use windows, which do not provide the necessary thermal isolation.

The above alternative combinations of the grid system make it possible for the plant to receive extra feeding with energy in addition to the energy requirement of its own life system. Particular care is taken that the plant products created (primary and secondary products) are formed quickly and are not used up for respiration. There is thus produced a continuously productive cultivating installation, which improves, stabilizes, and optimizes plant production at any geographic location, e.g., arid hot deserts, cold polar regions, or underground. The present invention makes it possible to improve the photosynthesis process by a combination of the various three-dimensional lattice systems, especially by a corresponding variance of the given lattice constants, utilizing the laws of spacing of the lights and with a minimum requirement for electric energy.

Figure 4:
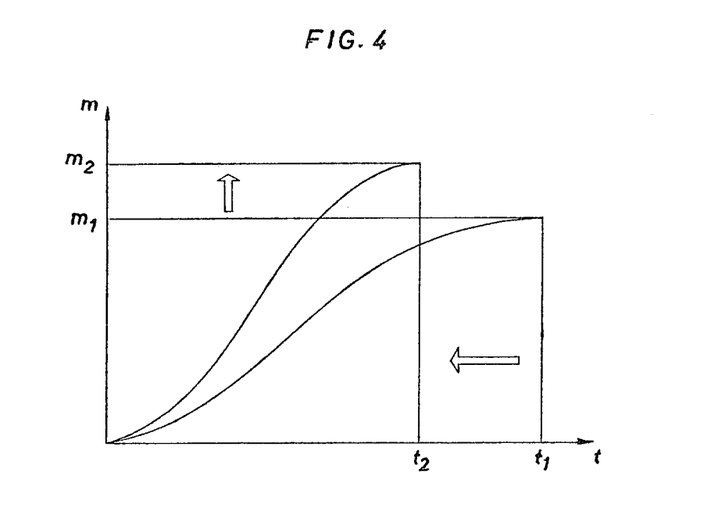
FIG. 4 is a yield-time diagram.

FIG. 4 shows the course of growth of a plant which, after the time period $t_1$, under natural environmental conditions, has obtained a bulk $m_1$, whilst the same plant, under the conditions in accordance with the invention and after a shorter period of time $t_2$, yields a higher bulk $m_2$. The differences $\Delta t = t_1 - t_2$ and $\Delta m = m_2 - m_1$ in accordance with the invention are supplied to a maximum value.

Figure 5:
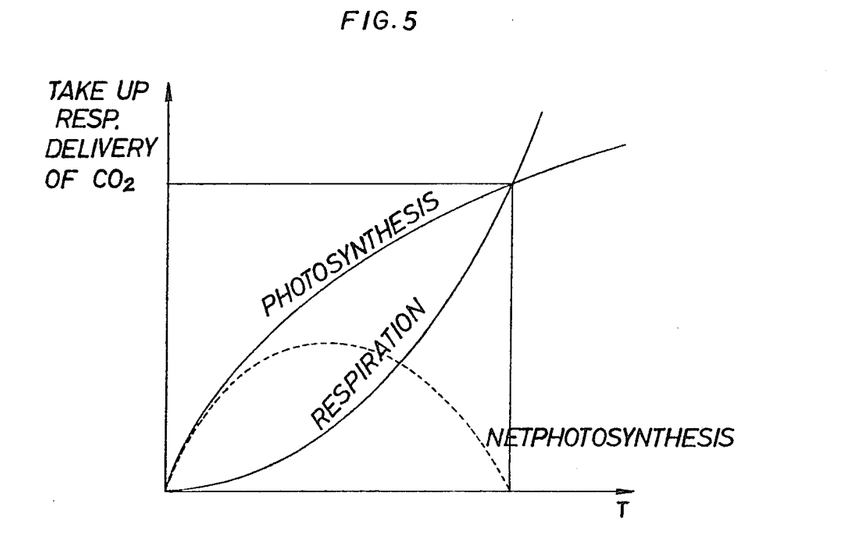
FIG. 5 is a graph showing the delivery and take-up of carbon dioxide.

FIG. 5 shows the $CO_2$ absorption of a plant as a function of temperature, whereby the proportion of photosynthesis and respiration of the plant are shown separately. The difference between the two values is shown by the net photosynthesis shown in broken lines which has an optimum substantially in the center of the graph. Determining the $CO_2$ contents, for example, by means of the appropriate sensor in the measuring grid, makes it possible to positively affect the net photosynthesis by means of the light lattice and the environment factor lattice.

Figure 6:
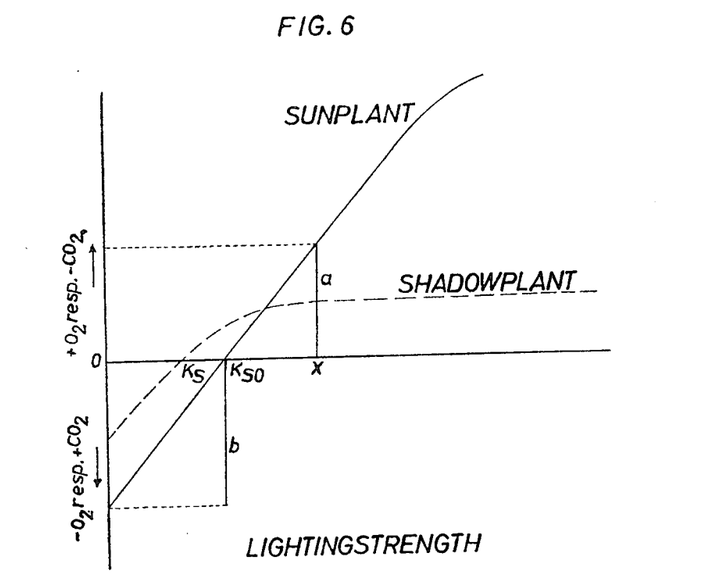
FIG. 6 is a graph showing gas changes with respect to lighting strength for the plants.

FIG. 6 serves to explain the compensation point. The oxygen and carbonic acid absorbtion and discharges of a plant are shown therein as a function of the light brightness, whereby the example of a sun flower (solid line) and a shade flower (broken line) has been chosen. Above the compensation point $K_{SO}$ of a sun flower, or $K_S$ of a shade flower, the plant emits oxygen and absorbs carbonic acid for the photosynthesis, whilst below the compensation point the plant, in an undesired manner, breathes in oxygen and emits carbonic acid. In this important connection, the growth is positively and optimally influencable with the apparatus of the inventive three-dimensional multiple lattice system.

Figure 7:
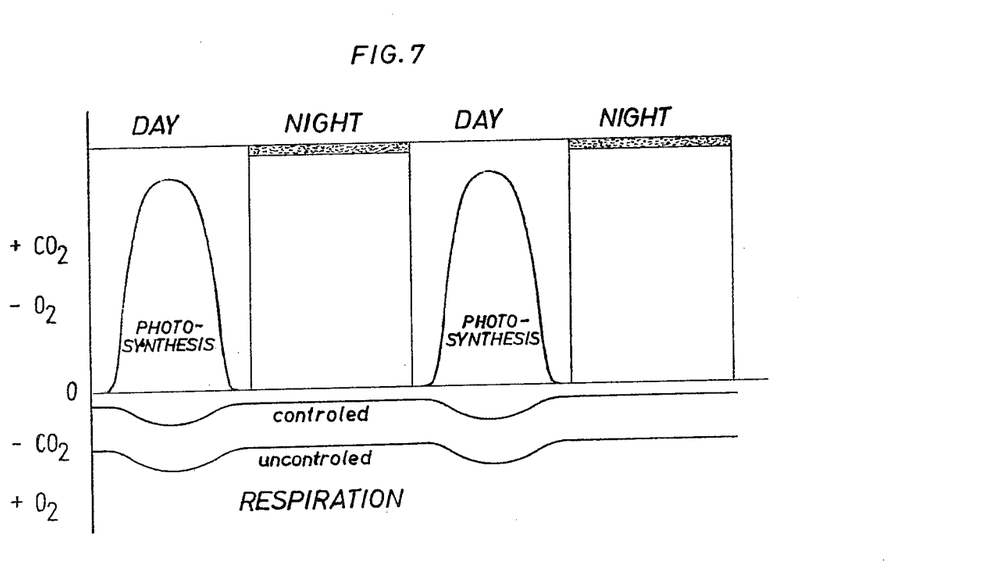
FIG. 7 is a graph plotting photosynthesis and respiration during day and night periods.

In FIG. 7 the natural period of this gas-change performance of a plant, according to FIG. 6, is shown as being time dependent. The photosynthesis occurs by day, whereby carbonic acid is absorbed and oxygen emitted by the plant. At the same time, a respirating process (light respiration) occurs, i.e., oxygen is absorbed and carbonic acid emitted, whereby this process may assume considerable values if it occurs uncontrolled. In accordance with the present invention, this undesired respiration process is controlled and reduced to a minimum. The influences of the above-identified devices on the multilattice system occur in such a manner that, for example, the cultivating space has oxygen extracted therefrom and carbonic acid supplied thereto as necessary. At night, respiration of the plant occurs (darkness respiration), which is also controlled by the present invention and reduced to a minimum.

Figure 8:
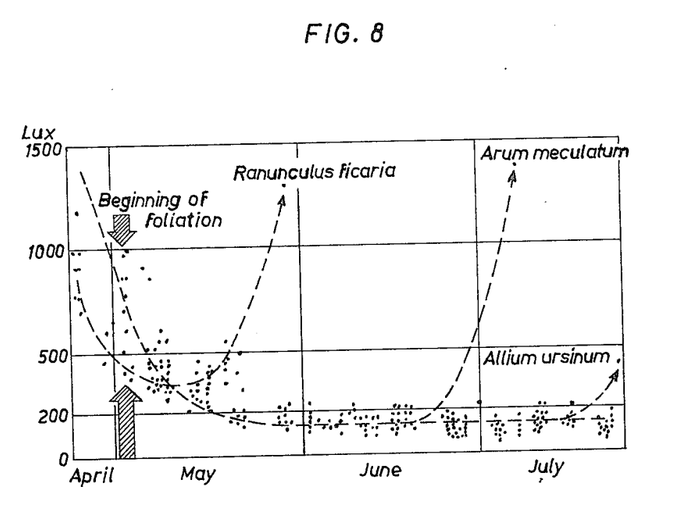
FIG. 8 is a plot of the course of the light compensation point of various plants over a long time period.

FIG. 8 shows the seasonal course of the compensation points of various plants. As shown therein, a considerable change of the light compensation point must be expected, particularly in spring at the beginning of the foliation period, therefore, the light grid must be controlled accordingly.

Figure 9:
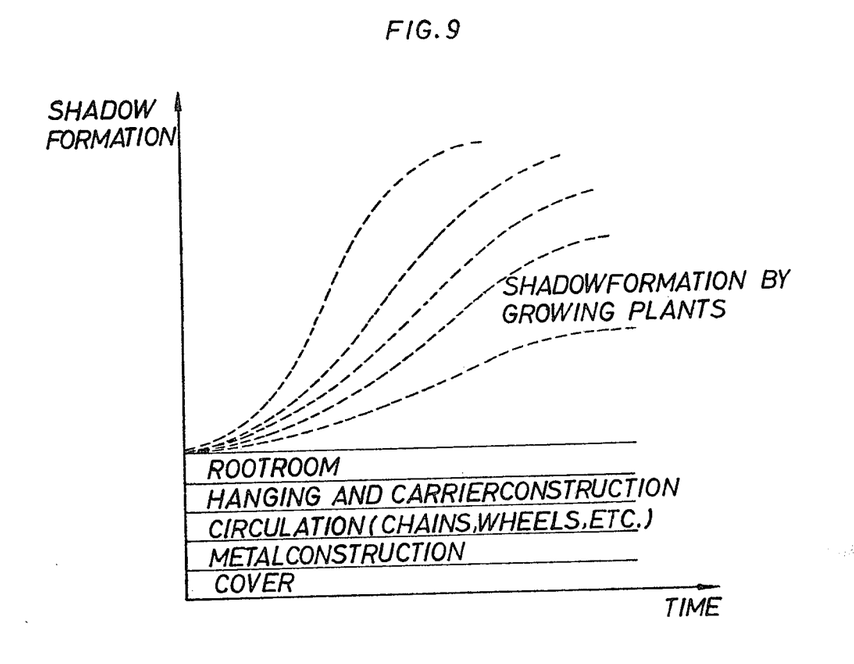
FIG. 9 is a graph plotting shade formation in a three-dimensional matrix cultivating space as a function of time.

FIG. 9 shows the timed increase of shade formation in the cultivating space, which is produced from constant shade components, e.g., root space, pendants and support, construction members, rotating chains, wheels, the steel structure, the covering, and also the increasing shade components of the plant itself. Herein also shade formation is possible with the aid of devices of the inventive multiple three-dimensional lattice system for controlling, to a required extent, the measured brightness. Because regulation of the brightness of the light grid in the relevant shade region can be achieved, the inventive system may be made adaptive to the given intensity of the sunlight.

It is understood that the foregoing is presented by way of example only and is not intended to limit the scope of the present invention, except as set forth in the appended claims.

What is claimed is:

1. An installation for the cultivation of plants comprising:

a framework defining a cultivation space;

a covering over said framework enclosing said cultivation space;

a space lattice formed of a plurality of plants located within said cultivation space, said plants being movably arranged to circulate in a continuous manner along a vertical serpentine path within said cultivation space;

drive means connected to said space lattice of plants for causing said plants to circulate in said vertical serpentine manner;

an illumination space lattice formed of a plurality of light sources structurally interconnected, electrically connected to a power source, and arranged in a interstitial manner adjacent said space lattice formed of a plurality of plants for illuminating said plants;

a measuring space lattice arranged substantially coextensive which said illumination space lattice so as to be also arranged in an interstitial manner adjacent said space lattice formed of a plurality of plants and having a plurality of measuring devices structurally interconnected and each producing an output indicative of the state of a preselected parameter of said cultivation space;

a display means connected to receive the outputs from said measuring devices for producing a display indicating the quantitative results of the preselected parameters being measured; and an environmental factor space lattice formed of interconnected tubes connected to sources of water and nutrients including means for selectively causing said sources to feed said environmental factor space lattice, said environmental factor space lattice being arranged substantially coextensive with said illumination space lattice and said measuring space lattice and arranged in an interstitial manner adjacent said space lattice formed of a plurality of plants, said tubes having opening therein at preselected locations for discharging water and nutrients into the cultivation space, whereby the formation of photosynthesis products for energy storage by the plants is at a maximum value, while the energy reducing respiration processes of the plants are reduced to a minimum.

2. The installation of claim 1, wherein said covering over said framework is light permeable.

3. The installation of claim 1, wherein said measuring devices of said measuring space lattice include at least a means for measuring light brightness, a means for measuring carbon dioxide content, and a means for measuring water content in said cultivation space.

4. The installation of claim 1 wherein said illumination space lattice includes socket means and light bulbs cooperating with said socket means, said socket means being adapted for rapid replacement of said light bulbs.

5. The installation of claim 1, wherein said electrical power source connected to said illumination space lattice includes means for varying the power delivered to said illumination space lattice for controlling the level of illumination thereof.

6. The installation of claim 1, wherein said plant space lattice is formed of two endless chains each arranged in a vertical serpentine manner over a plurality of sprockets and having a plurality of trays pivotably attached to corresponding points on said two chains, whereby said trays are maintained in a horizontal orientation.

7. The installation of claim 6, wherein said plurality of sprockets are arranged such that a sprocket is located only at the upper points of the continuous vertical serpentine chain arrangement, and the chains are permitted to fall free at the lower points of the vertical serpentine chain arrangement and having two sprockets located at the lowermost corners of said continuous vertical serpentine chain.

8. The installation of claim 7, wherein said drive means is connected to one of said two sprockets located at the lowermost corners of one of said continuous vertical serpentine chains.

9. The installation of claim 1, wherein said display means comprises a multichannel analog strip-chart recorder having inputs connected to said plurality of measuring devices for producing a visual record of said outputs from said measuring devices.

10. The installation of claim 9 further comprising a plurality of interface means, each connected to a respective one of said measuring devices and to said strip chart recorder, for adjusting the levels of the outputs from said measuring devices and feeding the adjusted signal levels to said strip chart recorder.

11. A method for improving the storage of biochemical energy in plants, comprising the steps of:
confining a cultivation space within a covered framework;
providing a space lattice of plants within said cultivation space wherein the plants are movable within said space lattice and arranged to follow a continuous serpentine path;
driving said plants within said space lattice of plants so that said plants circulate in a continuous manner along said serpentine path within said cultivation space;
illuminating said circulating plants by means of a fixed illumination space lattice formed of a plurality of light sources structurally interconnected, electrically connected to a power source, and arranged in an interstitial manner adjacent said space lattice formed of plants;
measuring preselected parameters in said cultivation space by means of a fixed measuring space lattice arranged substantially coextensive with said light illumination space lattice in an interstitial manner in relation to said space lattice of plants and having a plurality of measuring devices structurally interconnected and each producing an output indicating the state of said preselected parameter in said cultivation space;
displaying the outputs of said fixed measuring space lattice by means of a visual display means; and
controlling the environmental factors within said cultivation space by means of a fixed environmental factor space lattice formed of interconnected tubes connected to sources of water and nutrients including means for selectively connecting said sources to said environmental factor space lattice and being arranged substantially coextensive with said illumination space lattice and said measuring space lattice and arranged in an interstitial manner relative to said space lattice of plants, whereby the formation of photosynthesis products for energy storage by the plants is at a maximum value, while the energy reducing respiration processes of the plants are reduced to a minimum.

12. The method of claim 11, including the further step of varying the spacing of the light sources to vary the amount of light incident upon said plants dependent upon a desired photosynthesis result.

13. The method of claim 11, including the further step of adjusting the level of illumination so that the light strength lays beyond the compensation point of photosynthesis and the respiration process.

14. The method of claim 11, including the further step of measuring the carbonic acid, oxygen and moisture content of the atmosphere inside said cultivation space by means of the measuring devices in the measurement grid.

15. The method of claim 11, including the further steps of increasing the carbonic acid content and reducing the oxygen content in the cultivation space by means of the environmental factor space lattice.

16. The method of claim 11, including the further steps of creating dark periods within the cultivation space, and reducing the oxygen content within the cultivation space during the dark periods.

* * * * *